June 27, 1939. J. TJAARDA 2,164,096
REAR WHEEL SUSPENSION AND ENGINE MOUNTING
Original Filed April 4, 1936   5 Sheets-Sheet 2

INVENTOR
John Tjaarda
BY
Dike, Calver & Gray
ATTORNEYS

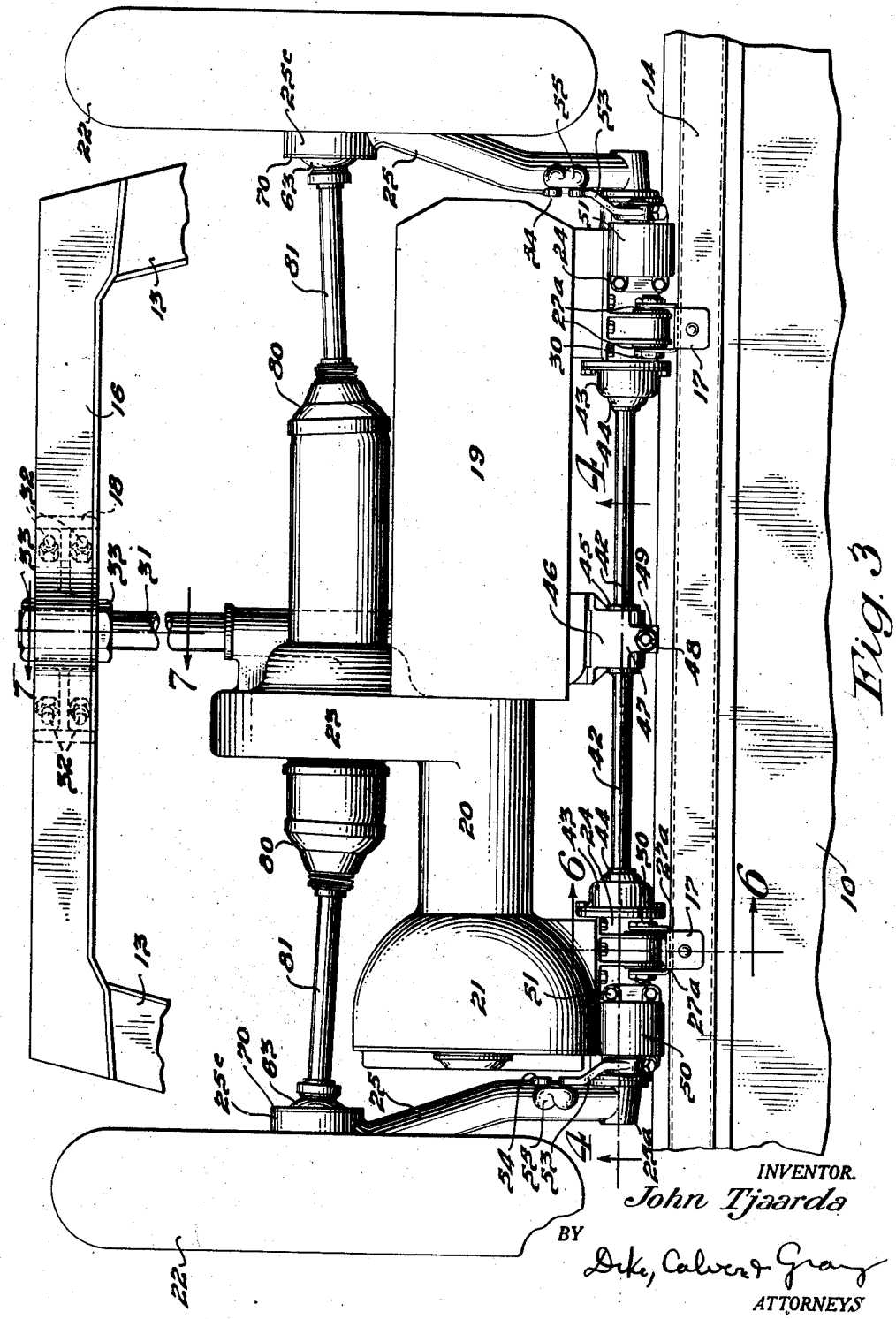

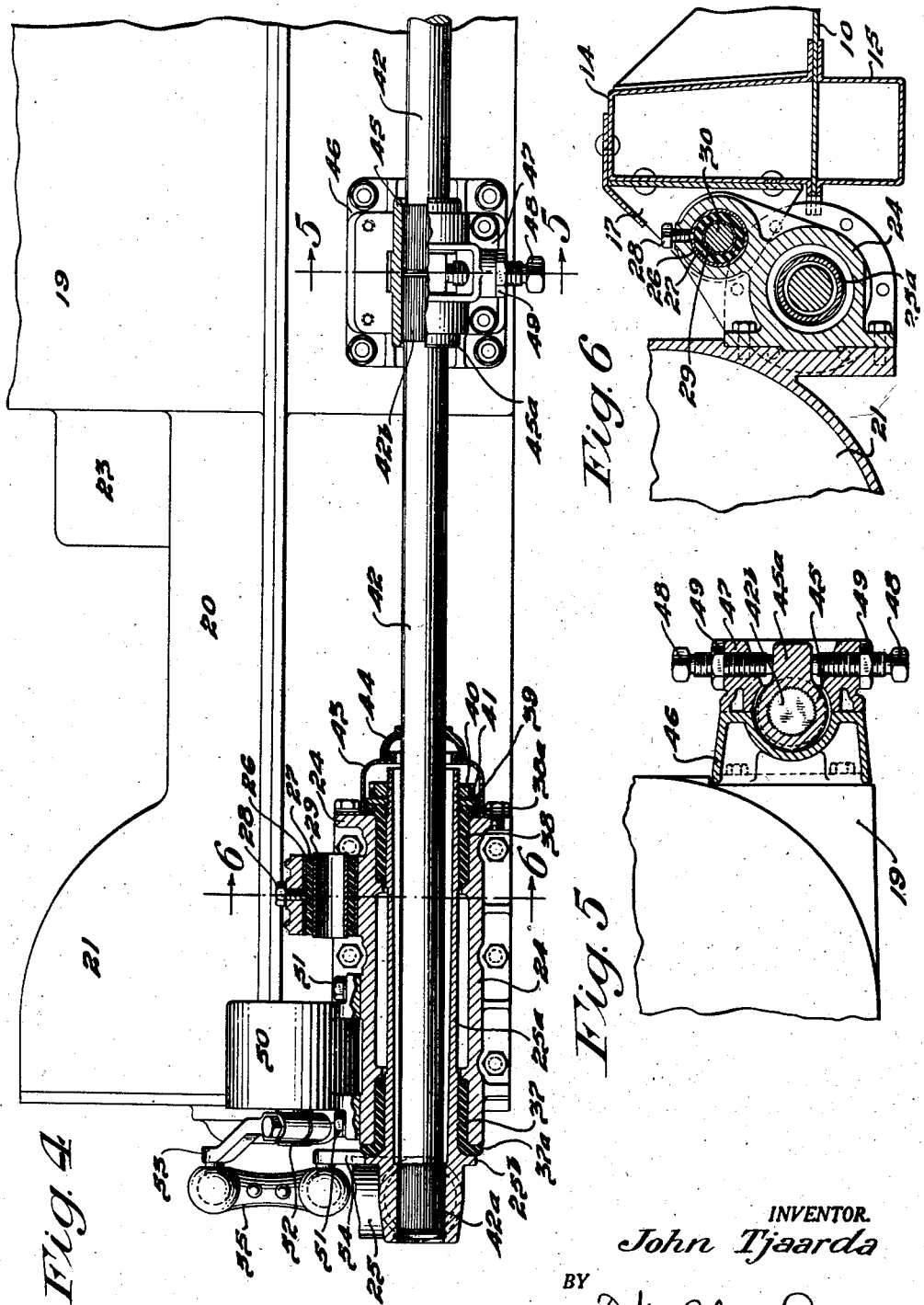

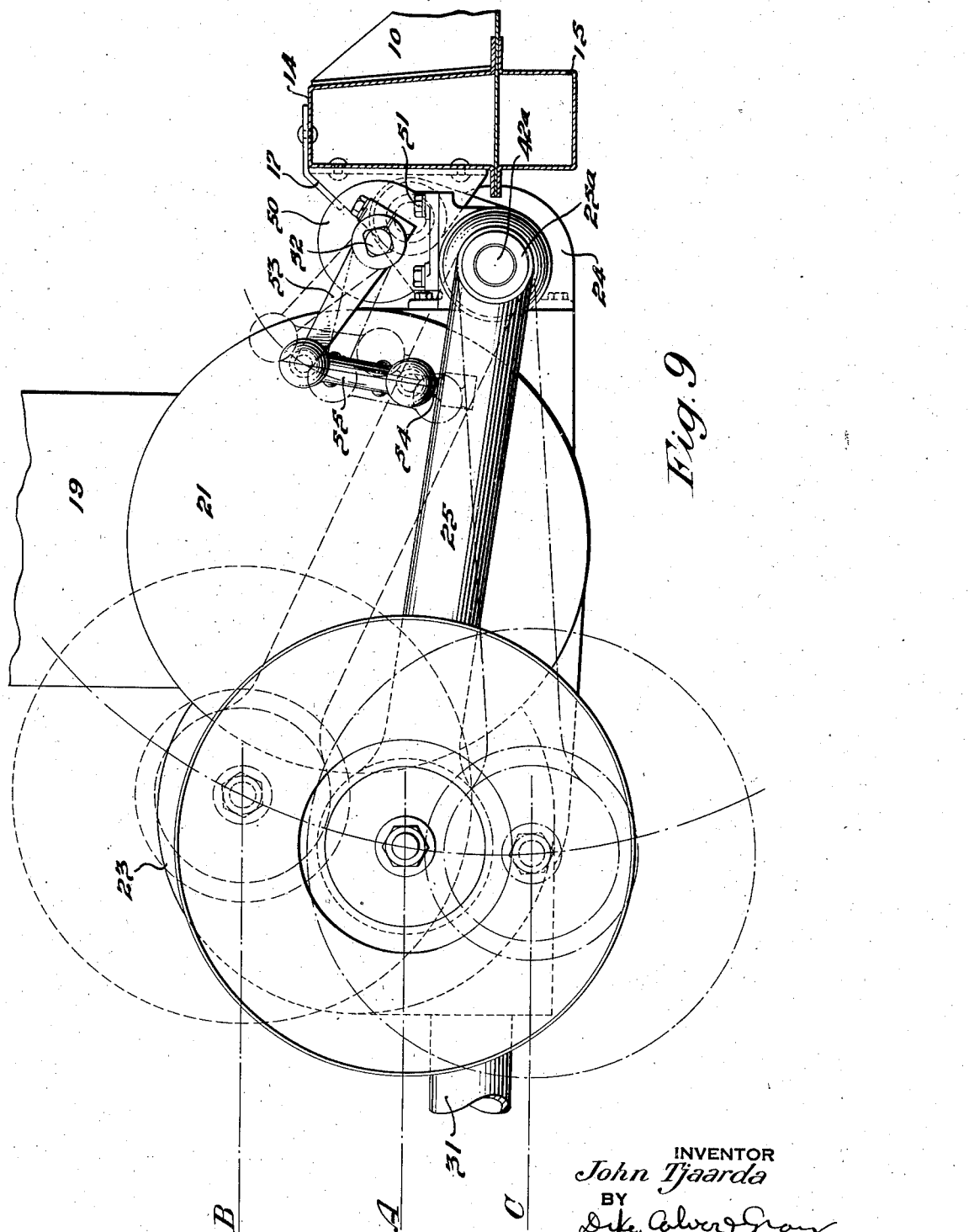

Patented June 27, 1939

2,164,096

UNITED STATES PATENT OFFICE 2,164,096

REAR WHEEL SUSPENSION AND ENGINE MOUNTING

John Tjaarda, Birmingham, Mich., assignor to Briggs Manufacturing Company, Detroit, Mich., a corporation of Michigan Application April 4, 1936, Serial No. 72,721
Renewed December 24, 1938

12 Claims. (Cl. 180—54)

This invention relates to rear engine automobiles and has for one of its principal objects to provide a compact and improved arrangement of rear wheel suspension, rear mounted engine and drive from the engine to the wheels.

Another object of this invention is to provide a rear wheel suspension and engine mounting in which the engine, clutch and transmission do not project substantially forward of the rear wheels and in which their weight is nevertheless in advance of the axes of said wheels.

Another object of this invention is to provide a rear wheel suspension and engine mounting in which the entire driving mechanism, including the engine and wheels, is secured to the body through sound deadening and vibration absorbing material so that there is no metal to metal path through which road rumble or engine noises can reach the body.

Another object of this invention is to provide a drive wheel mounting and hub arrangement which is very short in a direction perpendicular to the plane of the wheel, allowing a universal joint on a transverse propeller shaft to be placed far from the center of the car.

A further object of the invention is to provide an improved structure wherein the power unit or assembly, including engine, transmission, clutch, and differential or final drive, is substantially a separate unit supported directly on the rear driving wheels independently of the unitary vehicle frame and body and which unit in turn forms a carrier for the frame and body. As a consequence, since the chassis frame does not, as in conventional practice, support the power unit or assembly, its structure may be materially reduced in weight and merely requires sufficient strength to sustain the body and passenger loads.

The above and other objects of the invention will appear from the following description and appended claims when considered in connection with the accompanying drawings forming a part of this specification.

Fig. 3 is a plan view, on an enlarged scale, of the engine, the drive and the suspension with adjacent portions of the body.

Fig. 4 is a vertical sectional view on the line 4—4 of Fig. 3, taken in the direction of the arrows.

Fig. 5 is a vertical sectional view on the line 5—5 of Fig. 4, taken in the direction of the arrows.

Fig. 6 is a vertical sectional view on the line 6—6 of Fig. 3 and Fig. 4, taken in the direction of the arrows.

Fig. 9 is a side elevation of the spring suspension, partly diagrammatic, showing, in broken lines, the extreme positions of the wheel carrying arm.

Figure 1:
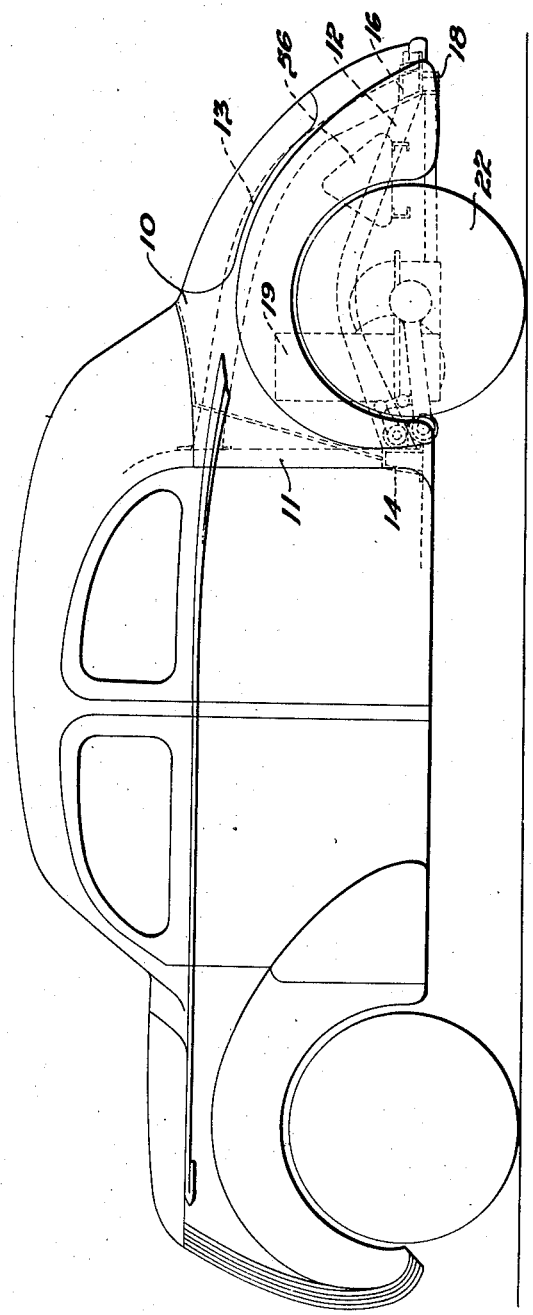
Fig. 1 is a side elevation of a motor vehicle embodying my invention with the position of the engine, the drive, the suspension and the body reenforcing members around them being shown in dotted lines.
Figure 2:
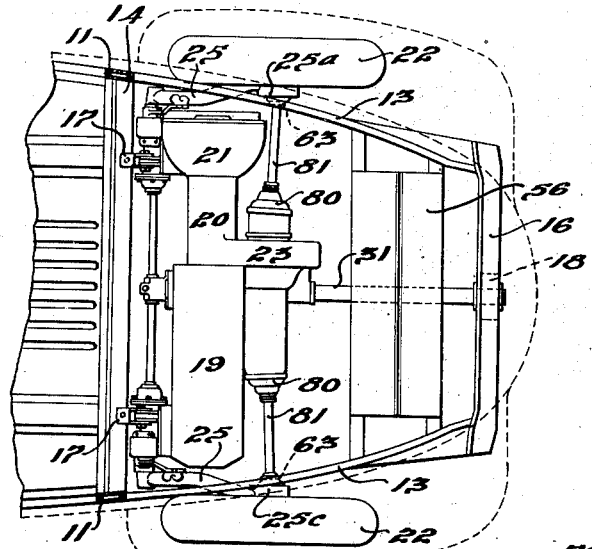
Fig. 2 is a plan view of the rear portion of the motor vehicle shown in Fig. 1, the greater part of the body being broken away to show the present invention.

Before explaining in detail the present invention, it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

The preferred embodiment of the invention, as shown in the drawings, forms part of an automobile having a semi-monocoque body 10 reenforced by door pillars 11, longitudinal framing members 12 and 13 and transverse framing members 14, 15 and 16, which surround an engine compartment in the rear of the body. The engine and rear wheel suspension are constructed as a single assembly which is mounted in the engine compartment and secured to brackets 17 on the cross member 14 in front of the compartment and a single bracket 18 on the cross member 16 in back of the compartment.

The engine or prime mover 19, transmission unit 20 including change speed gearing, and clutch unit 21 are in line with each other and extend across the car between the center line of the rear wheels 22 and the transverse framing members 14 and 15 at the front of the engine compartment. The engine 19 extends from the center line of the car to one side and the transmission 20 and clutch 21 lie at the other side, the transmission 20 being arranged between the clutch 21 and the engine 19 so that the drive to the rear wheels can be taken from it near the centerline of the car. The particular internal arrangement of the clutch 21 and the transmission 20 is a separate invention and is accordingly not described or illustrated in detail in this specification, but one convenient arrangement consists of a sliding gear or "Synchromesh" transmission having a hollow main shaft and clutch shaft through which the drive shaft from the engine 19 extends to the clutch 21.

The crankcase of the engine 19 and the housings of the clutch 21 and transmission 20 are rigid with each other and with the housing of the final drive and differential 23 lying directly behind the engine 19 and transmission 20. Since the engine 19, transmission 20 and clutch 21 extend in a line across the car, their sides face the front and the rear of the car. On the side facing the front are securely bolted two large brackets 24 spaced far apart, one on the housing of the clutch 21 and one on the crankcase of the engine 19 near the end away from the clutch 21. Besides carrying pivots 25a for the longitudinal swinging arms 25 which carry the rear wheels 22, the brackets 24 serve as part of the means for mounting the engine and suspension assembly in the body.

Each bracket 24 has a hole into which fits a metal sleeve 26 containing a resilient rubber bushing 27, the sleeve being retained by a setscrew 28 in the bracket 24, Figs. 4 and 6. The bushing 27 surrounds an inner metal sleeve 29 which projects slightly beyond the outer sleeve 26 and the portion of the bracket 24 containing it, the inner sleeve 29 fitting between the two legs or side flanges of the U-shaped bracket 17 on the transverse framing or body reenforcing member and being secured thereto by a bolt 30 which passes through the sleeve 29 and the legs of the bracket 17 and clamps them together. The inner sleeve 29 in the rubber bushing 27 projects out beyond the outer sleeve 26 and is surrounded by rubber washers 27a which lie between the sides of the portion of the bracket 17 carrying the bolt 30 through the inner sleeve 29 and the sides of the portion of the bracket 24 carrying the sleeve 26 (Fig. 3). There is thus no continuous metal to metal path between the engine and suspension and the body at either of the brackets 17.

Figure 7:
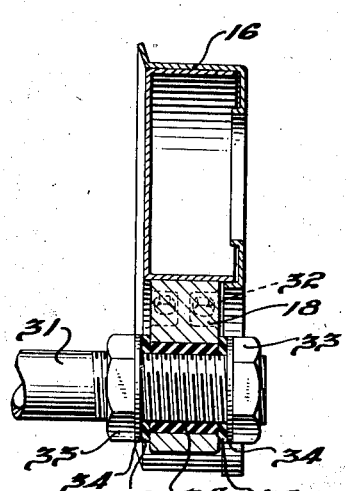
Fig. 7 is a vertical sectional view on the line 7—7 of Fig. 3, taken in the direction of the arrows.

The third point of support for the engine and suspension assembly is provided by a tube 31 rigidly secured to the housing of the differential 23 and extending back on the center line of the car under a fuel tank 56 to the rear transverse framing member 16 which arches up over it (Figs. 3 and 7). The end of the tube 31 passes through a large hole in a bracket 18 secured to the transverse framing member 16 by bolts 32 and is prevented from moving longitudinally in the hole by nuts 33 and washers 34 on the threaded end of the tube 31 at each side of the bracket 18. The tube 31 and the washers 34 are separated from the bracket by a thick rubber sleeve or bushing 35 surrounding the tube 31 and by thick rubber thrust washers 36 lying between the metal washers 34 and the front and back of the bracket 18, thus avoiding any metal to metal path from the engine and suspension to the body at this point Each of the two large brackets 24 on the front of the crankcase of the engine 19 and the housing of the clutch 21 by which the engine and suspension assembly is secured to the transverse body framing member 14 in front of the engine compartment has, as its major function, the carrying of a pivot or spindle 25a of one of the wheel suspension arms 25. Each arm 25, which extends longitudinally of the car, has a tubular spindle 25a formed integrally with it and extending inwardly transversely of the car through one of the large brackets 24 on the front of the engine and transmission assembly (Fig. 4). Each spindle 25a is separated from its bracket 24 by a pair of resilient rubber bushings 37 and 38, one bushing 37 having a flange 37a extending out between the end of the bracket 24 and an annular flange 25b on the spindle 25a and the other bushing 38 having a flange 38a extending out between the other end of the bracket 24 and a washer 39 held in place on the end of the spindle 25a by a nut 40 and a nut lock 41, the nut 40 being screwed onto the inner threaded end of the spindle (Fig. 4). The two rubber bushings 37 and 38 are resilient enough to allow the spindle 25a to rotate slightly against the torsional resistance of the rubber and to allow the arm 25 carried by the spindle 25a to swing vertically far enough to give the desired travel, with respect to the body, of each wheel 22 on the end of its arm 25.

The swinging of each wheel arm 25 is resiliently restrained by a cylindrical torsion bar 42 lying on the axis of the wheel arm spindles 25a and having its opposite ends 42a and 42b secured to the rotatable spindle 25a and to the fixed crankcase of the engine 19 (Figs. 4 and 5). The outer end 42a of each torsion bar 42 is splined into the outer end of one of the spindles 25a, the bar 42 extending through the spindle 25a to the center line of the car and abutting the inner end 42b of the torsion bar 42 on the other side of the car. The point where the torsion bar 42 emerges from the hollow spindle 25a is closed by a small bell-shaped housing 43 bolted to the side of the bracket 24 and by a rubber sleeve 44 secured to the housing 43 and fitting tightly around the torsion bar 42 (Figs. 3 and 4).

The inner ends 42b of the two bars 42 are splined into a short sleeve 45 carrying a lug 45a projecting forward at right angles to the sleeve 45 (Fig. 5). The ends of the sleeve 45 are carried in bearings formed in a bracket 46 bolted to the crankcase of the engine 19 and a cap 47 bolted in turn to the bracket 46. The lug 45a on the sleeve 45, into which the inner ends 42b of the torsion rods 42 are splined, projects into an aperture in the cap 47 and is accurately positioned and firmly held therein by a pair of setscrews 48 engaging the top and bottom surfaces of the lug 45a and themselves secured by locknuts 49.

When the weight of the rear portion of the car is carried by the rear wheels 22, it will tend to rotate the spindles 25a of the wheel carrying arms 25, the rotation of the spindles 25a being resiliently resisted by the torsion rods 42 which form the rear springs of the car. The normal position of the rear wheels of the car can be adjusted by slightly rotating the sleeve 45 into which the inner ends 42b of the torsion bars 42 are splined, the rotation of the sleeve 45 being done by means of the setscrews 48 bearing on the lug 45a on the sleeve.

The movement of the wheel arms 25 with respect to the car is controlled by conventional double acting hydraulic shock absorbers 50 mounted on the tops of the large wheel arm spindle bearing brackets 24 and secured thereto by means of suitable bolts 51 (Fig. 4). The shock absorber rock shafts 52 are parallel to the axis of the wheel arm spindles 25a and carry rearwardly projecting arms 53 which are joined to brackets 54 on the wheel arms 25 by short links 55 of conventional structure.

Figure 8:
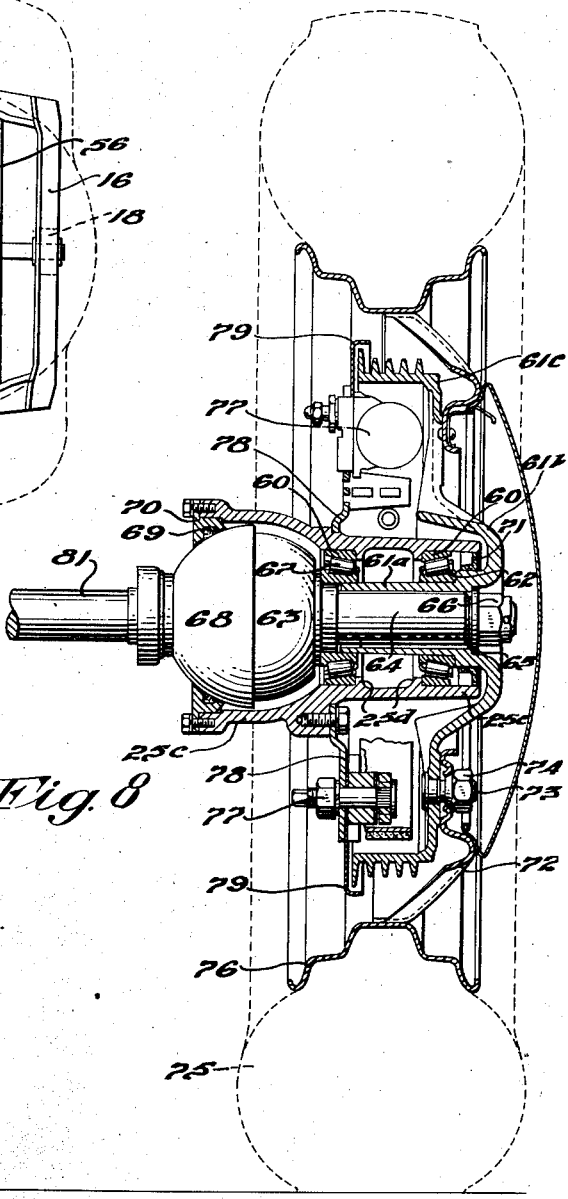
Fig. 8 is a vertical sectional view taken through the axis of one of the wheels.

The wheel arms 25 extend back past the ends of the engine 19 and clutch 21, and the ends of the arms 25 are arranged to carry the rear wheels 22 of the automobile (Fig. 3). The end of each arm 25 is formed into a short wheel bearing and universal joint housing 25c extending transversely of the car (Figs. 3 and 8). The outer section of the housing 25c carries the tapered roller bearings for the wheel, the outer races 60 of the bearings fitting into the housing 25c from opposite ends and abutting against internal shoulders 25d (Fig. 8). The tubular wheel spindle 61a, which is formed integrally with the hub 61b and brake drum 61c, fits into the inner races 62 of the bearings, thus supporting the wheel on the end of the wheel arm 25. The wheel spindle 61a is driven through a universal joint 63 located in the inner hollow section of the bearing and universal joint housing 25c and having a stub shaft 64 extending through and keyed to the tubular wheel spindle 61a. A thrust washer 65 and a wheel nut 66 on the end of the universal joint stub shaft 64 hold it in place in the wheel spindle 61a, and a pair of shoulders, one on the universal joint 63 and one on the wheel spindle 61a, face each other and engage the sides of the inner bearing races 62. The shoulders on the universal joint 63 and the wheel spindle 61a position the wheel spindle 61a, the universal joint 63 and the stub shaft 64 axially and hold the inner races 62 against the rollers 67, the rollers 67 against the outer races 60 and the outer races 60 against the shoulders 25d in the wheel bearing and universal joint housing 25c.

The universal joint 63 is provided with an outer hemispherical shell 68 on the side of the joint 63 away from the wheel. The outside of the hemispherical shell 68 provides a surface upon which bears a packing or sealing means 69 carried by a retainer ring 70 bolted onto the inner end of the universal joint and wheel bearing housing 25c. The other end of the housing 25c is closed by a seal 71 which bears against the cylindrical outer surface of the wheel spindle 61a. Thus the escape of grease from either end of the housing 25c is prevented.

The wheel hub 61b carries a pressed sheet metal wheel 72, secured to it by studs 73 and nuts 74 in the conventional manner and carrying a pneumatic tire 75 on a conventional drop center rim 76. The rotation of the wheel is controlled by a hydraulic braking mechanism 77 mounted within and acting upon the brake drum 61c formed integrally with the wheel hub 61b. The braking mechanism 77 is carried by a brake backing plate 78 mounted on the universal joint and wheel bearing housing 25c and is enclosed by the brake drum 61c, the brake backing plate 78, and a splash guard 79 carried by the brake backing plate 78 and extending out and enclosing the edge of the brake drum 61c. The hydraulic braking mechanism 77 per se forms no part of the present invention and is therefore not described or illustrated in detail.

The drive to each of the wheels is through the universal joints 63 at the wheel hubs, the drive coming to these joints 63 through transverse drive or propeller shafts 81 from universal joints 80 at each side of the differential 23. The details of the final drive, differential, and the universal joints per se form no part of the present claimed invention and are therefore not illustrated or described in detail.

From the forgoing it will be seen that the power mechanism, including the engine 19, transmission 20, clutch unit 21, and differential or final drive mechanism 23, arranged transversely of the longitudinal frame sills 13 and intermediate the same, constitutes a single unit adapted to be readily installed or removed as such. The power mechanism is arranged intermediate the front and rear frame members 14 and 16, and the unitary body and frame structure of the vehicle is supported from the driven wheels 22 at three points 17 and 18 through the medium of the power mechanism which in turn is supported directly on the wheels 22.

I claim:

1. In an automobile, a pair of vertically movable wheels; an engine, transmission unit and clutch unit located in said order and in line transversely of the automobile entirely in advance of the transverse wheel axis, a final drive and differential unit positioned in rear of the transmission unit and normally substantially in line with the wheel axes, and a pair of transverse drive shafts each including universal joints extending from the final drive unit to the wheels, the universal joints of one shaft being at a greater distance from said final drive unit than the universal joints of the other shaft.

2. In an automobile, a pair of vertically movable wheels; an engine, transmission unit and clutch unit located in said order and in line transversely of the automobile entirely in advance of the transverse wheel axis, a final drive and differential unit positioned in rear of the transmission unit and normally substantially in line with the wheel axes, means for supporting said engine and said final drive unit at opposite lateral sides of the center line of the automobile, and independent supporting means for the final drive unit extending rearwardly of said wheel axes.

3. In an automobile, a pair of vertically movable wheels; an engine, transmission unit and clutch unit located in said order and in line transversely of the automobile entirely in advance of the transverse wheel axis, a final drive and differential unit positioned in rear of the transmission unit and normally substantially in line with the wheel axes, spaced transverse frame members located in advance and to the rear of said wheel axes, means attached to one of said frame members for supporting said engine and said final drive unit at opposite sides of the longitudinal center line of the automobile, and separate supporting means for the engine and final drive unit attached to the other of said frame members.

4. In an automobile, a pair of drive wheels, an engine and transmission means rigidly secured together and forming an assembly extending transversely of the automobile, means connected to the assembly and to the drive wheels for guiding the drive wheels in a substantially vertical path with respect to the assembly, resilient means for urging the drive wheels down with respect to the assembly, and common sound and vibration absorbing means for connecting the assembly to the main part of the automobile.

5. In an automobile, a body, a pair of drive wheels, an engine and transmission means rigidly secured together and forming an assembly extending transversely of the automobile between the drive wheels, means connected to the assembly and to the drive wheels for guiding the drive wheels in a substantially vertical path with respect to the assembly, resilient means for urging the drive wheels down with respect to the assembly, laterally spaced means for connecting the assembly to the body, and means spaced longitudinally from said last mentioned means for further connecting the assembly to the body.

6. In an automotive vehicle, a body and chassis unit and rear driven wheels; a transverse frame member in front of said wheels and a transverse frame member in rear of said wheels; engine, transmission and clutch units extending in line transversely of the vehicle and forming a unitary assembly; drive means interposed between said assembly and wheels; a pair of transversely spaced connections for supporting said assembly at two points on said first named frame member; a connection for supporting said assembly at a central point on said second named frame member in rear of said drive means, and resilient means for insulating said connections from said frame members.

7. In an automotive vehicle, a body and chassis unit and rear driven wheels; a transverse frame member in front of said wheels and a transverse frame member in rear of said wheels; engine, transmission and clutch units extending in line transversely of the vehicle and forming a unitary assembly; drive means interposed between said assembly and wheels; a pair of transversely spaced connections for supporting said assembly at two points on said first named frame member; a connection for supporting said assembly at a central point on said second named frame member in rear of said drive means, oscillatable members for carrying said wheels to permit vertical movements thereof and supported through the medium of said spaced connections, resilient means for insulating said members from said connections, and resilient means for insulating said connections from said frame members.

8. In a motor vehicle, a pair of rear driven wheels, a power unit including an engine extending transversely of the vehicle, longitudinal frame members between which said power unit is arranged, a pair of longitudinally spaced transverse frame members connecting said longitudinal frame members and located one in advance and one in rear of the power unit, said power unit being carried directly by the wheels and said transverse frame members being carried by the wheels through the medium of connections to said power unit.

9. In a motor vehicle, a pair of rear driven wheels, a power unit including an engine extending transversely of the vehicle, longitudinal frame members between which said power unit is arranged, a pair of longitudinally spaced transverse frame members connecting said longitudinal frame members and located one in advance and one in rear of the power unit, said power unit being carried directly by the wheels and said transverse frame members being carried by the wheels through the medium of connections to said power unit, said connections comprising two transversely spaced connections with said forward transverse frame member and a single connection with said rear transverse frame member.

10. In a motor vehicle, a pair of rear driven wheels, a power unit including an engine extending transversely of the vehicle in advance of the normal transverse axis of said wheels, longitudinal frame members between which said power unit is arranged, a pair of longitudinally spaced transverse frame members connecting said longitudinal frame members and located one in advance and one in rear of the power unit, said power unit being carried directly by the wheels and said transverse frame members being carried by the wheels through the medium of connections to said power unit.

11. In an automobile, a pair of vertically movable drive wheels, an engine and transmission extending transversely of the automobile between the wheels entirely in advance of the transverse axis of the wheels, a final drive located between the wheels and connected to the side of the engine and transmission, jointed drive means extending transversely of the automobile from the final drive to the wheels, a vehicle frame including transverse frame members in advance and in rear of said engine and said transmission, and means mounted upon said transverse frame members for supporting the vehicle frame on said engine and said transmission.

12. In an automobile, a pair of vertically movable drive wheels, an engine and transmission extending transversely of the automobile between the wheels entirely in advance of the transverse axis of the wheels, a final drive located between the wheels and connected to the side of the engine and transmission, jointed drive means extending transversely of the automobile from the final drive to the wheels, a vehicle frame including transverse frame members in advance and in rear of said engine and said transmission, and means for supporting the vehicle frame on said engine and said transmission, said means comprising a two point connection from the forward frame member and a one point connection from the rear frame member.

JOHN TJAARDA.